United States Patent [19]

Asami

[11] 4,420,194

[45] Dec. 13, 1983

[54] BALL SLIDEWAY

[75] Inventor: Kanji Asami, Hino, Japan

[73] Assignee: Hephaist Seiko Co., Saitama, Japan

[21] Appl. No.: 283,348

[22] Filed: Jul. 14, 1981

[30] Foreign Application Priority Data

Jul. 21, 1980 [JP] Japan .................................. 55-99713

[51] Int. Cl.³ ............................................. F16C 29/06
[52] U.S. Cl. .................................................. 308/6 C
[58] Field of Search ............. 308/6 C, 3 A, 6 R, 3 R, 308/3.5, 3.8

[56] References Cited

U.S. PATENT DOCUMENTS

| | | | |
|---|---|---|---|
| 3,608,985 | 9/1971 | Swanson | 308/6 C |
| 4,030,191 | 6/1977 | Ernst et al. | 308/6 C |
| 4,253,709 | 3/1981 | Teramachi | 308/3 A X |
| 4,296,974 | 10/1981 | Teramanchi | 308/6 C |
| 4,304,443 | 12/1981 | Hoffmann | 308/6 C |
| 4,363,526 | 12/1982 | Teramachi | 308/6 C |

FOREIGN PATENT DOCUMENTS 2072766  3/1981  United Kingdom ............... 308/6 C Primary Examiner—Stuart S. Levy
Assistant Examiner—David J. Werner
Attorney, Agent, or Firm—Staas & Halsey

[57] ABSTRACT

A ball slideway which is employed, for example, for slidably supporting a work table on the bed of a machine tool, and which is suitable for use with large loads and easy to manufacture. A ball slides are provided with two ball circulating paths, each holding therein a number of balls. A ball slide is disposed on either side of an elongated rectangular guide member between the guide member and the inner sides of a bracket which surrounds three sides of the guide member. The balls make angular contact with both sides of the guide member and the adjacent inner sides of the bracket.

1 Claim, 12 Drawing Figures

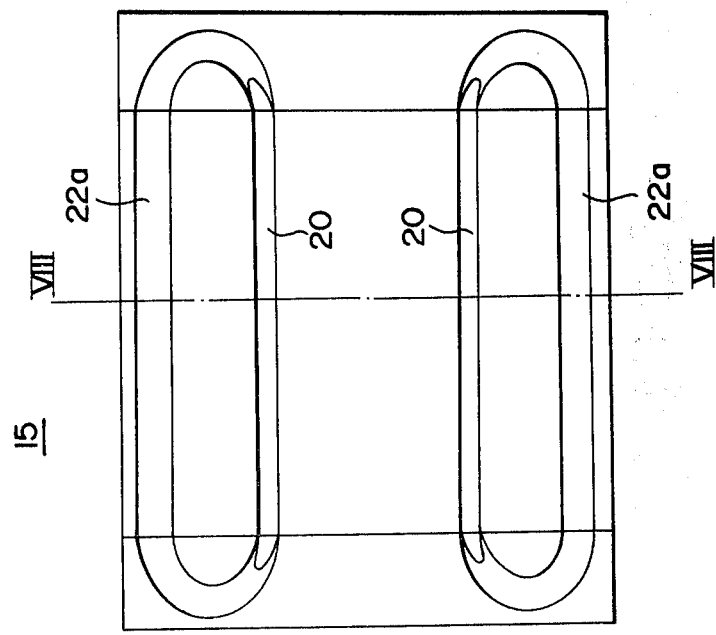
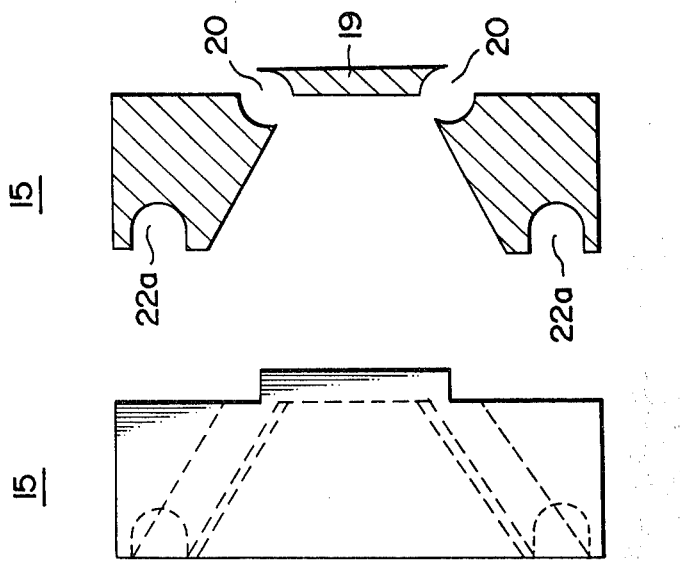

BALL SLIDEWAY

BACKGROUND OF THE INVENTION

1. Field of the Invention

The present invention relates to a ball slideway which is used as a guide for linear movement of a bed of a machine tool or the like, and more particularly to a ball slideway suitable for supporting large loads.

2. Description of the Prior Art

For enhancement of the working efficiency of a machine tool, it is necessary to increase the moving speed of a work table which is slidably mounted on the bed. Accordingly, it is important to reduce the sliding resistance between the bed and the work table.

As a solution to this problem, the prior art generally employs a straight antifriction bearing, an example of which is shown in FIGS. 1 to 3. FIG. 1 shows in perspective the external appearance of a ball slideway using the straight antifriction bearing and FIG. 2 is its side view. In FIGS. 1, 2 and 3, reference numeral 1 indicates a bed; 2 designates a work table; 3 identifies brackets; and 4 and 5 denote caterpillar type ball slides. In the bed 1 there are provided a pair of rectangular guide members 6 the surfaces of which have been hardened. The brackets 3 each have a cross section surrounding the guide member 6 and they are mounted on the work table 2 at four corners thereof. The caterpillar type ball slides 4 are disposed between each bracket 3 and the top and bottom surfaces of each guide member 6, and the caterpiller type ball slides 5 are disposed between the bracket 3 and both sides of the guide member 6. The caterpillar type ball slides 4 and 5 each have a cross section as depicted in FIG. 3 and they are installed in such a manner as to apply a preload to each ball 7. When the work table 2 is moved in the direction of the arrows A and A' in FIG. 1, the balls 7 of the caterpillar ball slides 4 and 5 circulate, while rolling, along a circulatory path formed by upper guide grooves 4a and 5a and lower guide grooves 4b and 5b. By such circulation of the balls 7 while rolling, the work table 2 is slidably supported without play on the guide members 6 of the bed 1 and the sliding resistance is small.

However, the conventional ball slideway having such a construction and an operation has a defect in that the load capacity is small because the ball guide surfaces of the guide grooves 4a and 5a and the guide members 6 are all flat.

This problem can be solved by employing rollers in place of the balls. However, although the load capacity increases, the adjustment of the preload is not as easy as with balls, in which case use is made of elastic deformation of the balls. Further, in either case, it is necessary to form ball or roller slides in four guide surfaces of the guide members so as to provide load capacity for loads acting on the guide members in all directions; this inevitably leads to complexity in structure. In addition, working of the ball slides 4 and 5 is troublesome.

SUMMARY OF THE INVENTION

Accordingly, it is an object of the present invention to provide a ball slideway which permits easy preload adjustment, has a large load capacity, and is easy to manufacture.

Other objects, features and advantages of the present invention will become more apparent from the following description taken in conjunction with the accompanying drawings.

BRIEF DESCRIPTION OF THE DRAWINGS

FIGS. 6 and 7 are a side and a plan view of a ball retainer;

FIG. 8 is a sectional view taken on the line VIII—VIII in FIG. 6;

DESCRIPTION OF THE PREFERRED EMBODIMENTS

A detailed description will be given, with reference to FIGS. 4 to 12, of the present invention.

FIGS. 4 to 8 illustrate an embodiment of the ball slide way of the present invention.

Figure 4:
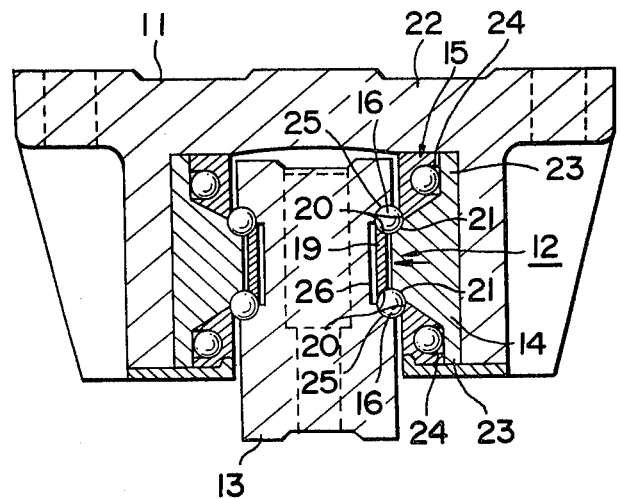
FIG. 4 is a sectional view illustrating an embodiment of the ball slideway of the present invention.
Figure 5:
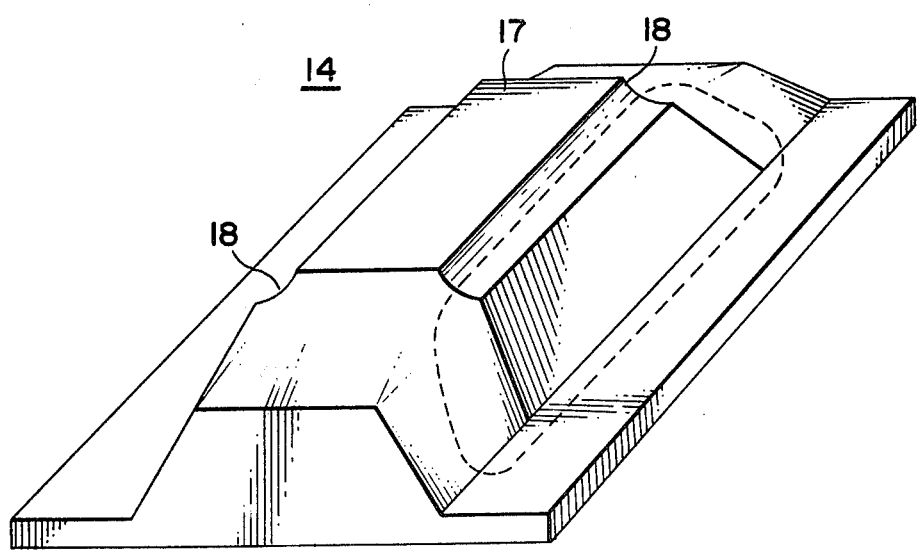
FIG. 5 is a perspective view showing a ball slide body.

FIG. 4 is a sectional view of a ball slideway. In FIG. 4, reference numeral 11 indicates a bracket; 12 designates generally a ball slide; and 13 identifies a guide member. The bracket 11 surrounds the top surface and right and left sides of the guide member 13, and the ball slide 12 is provided between the bracket 11 and the sides of the guide member 13. The ball slide 12 is composed of a ball slide body 14 having a configuration as shown in detail in FIG. 5, a ball retainer 15 having a configuration as depicted in detail in FIGS. 6 to 8, and balls 16. The ball retainer 15 is attached to the ball slide body 14. The balls 16 circulate, while rolling, in a ball circulatory path which is provided by upper guide grooves 21 (formed by two ball grooves 18, cut in both edges of a top surface 17 of the ball slide body 14 and extending in the lengthwise direction of the guide member 13, and guide grooves 20, cut in the ball retainer 15 near its upper portion 19 and corresponding to the ball grooves 18) and by two lower guide grooves 24 (formed by guide grooves 22a, cut in the lower portion 22 of the ball retainer 15, and a bottom plate 23 of the ball slide body 14). In FIG. 5 the broken line indicates the ball circulatory path. Each side of the guide member 13 has two ball grooves 25 extending in its lengthwise direction for receiving approximately a quarter of the peripheral surface of each ball 16. The balls 16 held in the upper guide grooves 21 make angular contact with the ball grooves 25 and 18. In this case, an appropriate preload is applied to this contact portion by urging the ball slide 12 against the guide member 13 as indicated by the arrow in FIG. 4. This preload can easily be adjusted, for example, by a shim of the proper thickness between the bottom of the ball slide body 14 and the guide member 13. It is also possible to press the ball slide by means of a screw or the like. A recess 26 is formed in the guide member 13 between the ball grooves 25, and the upper portion 19 of the ball retainer 15 is housed in the recess 26. If a combination of ordinary ball grooves were used instead of a combination of angular contact type guide grooves, there would be little space, and hence it would be difficult to incorporate the retainer. Even if the retainer were incorporated by force, the balls could not be held securely by the retainer, unlike in this example, and it would be difficult to prevent the balls from coming off when the bracket is removed from the guide member. In contrast thereto, in this example, even if the bracket 11 is disassembled from the guide member 13, the balls 16 are retained by the upper guide grooves 21 and do not come off. Further, even if external forces act on the bracket 11 in various directions, the bracket 11 is firmly held and does not move because the balls 16 are in engagement with the two ball grooves 25 in either side of the guide member 13. In addition, since the balls 16 make angular contact with the grooves, the load capacity is large. The distance between the ball grooves 25 can be enlarged by utilizing the entire width of the side of the guide member 13 and can be selected according to the magnitude of load capacity.

A ball slideway of such a construction is used, for example, as a sliding support member between the bed and the work table of a machine tool in the following manner:

Two guide members 13 of suitable length are mounted on the bed and two brackets 11, each holding a pair of ball slides 12, are combined with each guide member 13, with the balls 16 of each ball slide 12 engaging the ball grooves 25. These four brackets are fixed to the work table at predetermined intervals.

In this way, the work table can be mounted on the bed through the four ball slideways. When sliding the work table, the balls 16 are guided by the ball grooves 18 and the ball grooves 25 of the guide members 13 to roll from the upper guide grooves 21 of the ball slide 12 to the lower guide grooves 24 and thence to the upper guide grooves 21. Accordingly, the work table is slidably supported on the bed and, in addition, since the balls make angular contact with the guide grooves, the load capacity can be increased. In this case, even if external forces act on the work table in various directions, the work table is firmly held because the balls 16 of each ball slide 12 held by each bracket 11 are in engagement with the two guide grooves 25 on both sides of the guide member 13.

While in the foregoing the bracket and the ball slide are described as being separate of each other, it is also possible to form the body of the ball slide as a unitary structure with the bracket.

FIGS. 9 to 12 illustrate another embodiment of the present invention.

Figure 9:
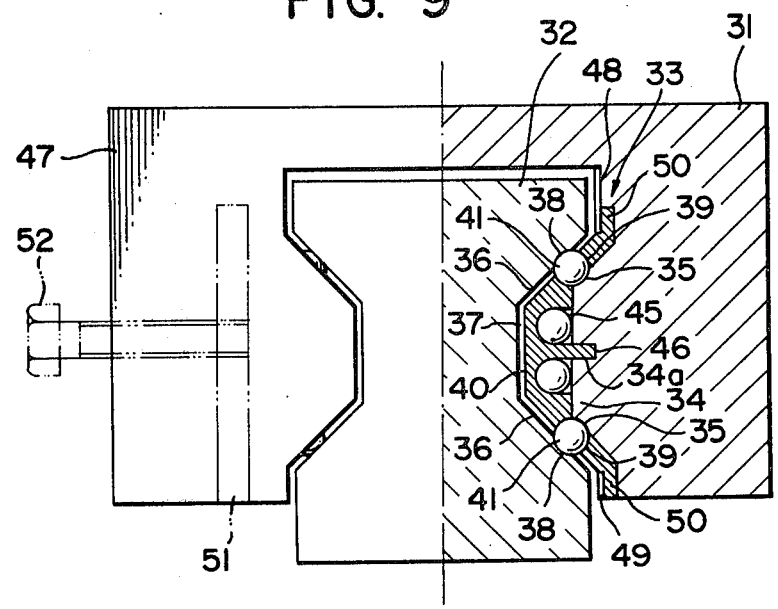
FIG. 9 is a front view illustrating another embodiment of the ball slide way of the present invention.
Figure 10:
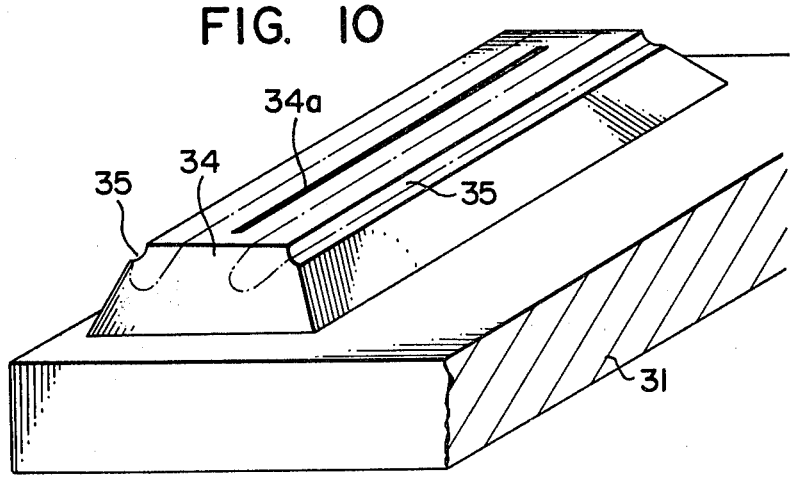
FIG. 10 is a perspective view showing a projecting portion of a bracket used in FIG. 9.

FIG. 9 is a front view showing another example of the ball slideway of the present invention. In FIG. 10, reference numeral 31 indicates a bracket; 32 designates a guide member; and 33 identifies a ball slide.

The bracket 31 surrounds the top surface and right and left sides of the guide member 32 in its lengthwise direction (perpendicular to the sheet). On the surfaces of the bracket 31 opposing both sides of the guide member 32, there are provided projections 34 extending in the lengthwise direction of the guide member 32, and ball grooves 35 are formed in the edges of each projection 34, as shown in FIG. 10.

Either side of the guide member 32 has cut therein a recess 37 having a pair of outwardly inclined slopes 36.

A ball groove 38 is formed in the intermediate portion of each slope 36.

Figure 11:
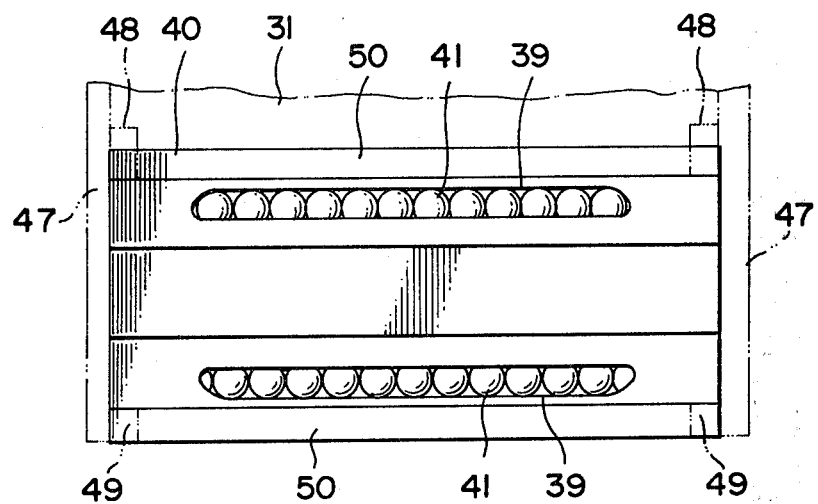
FIG. 11 is a left side view of the ball slide employed in FIG. 9.
Figure 12:
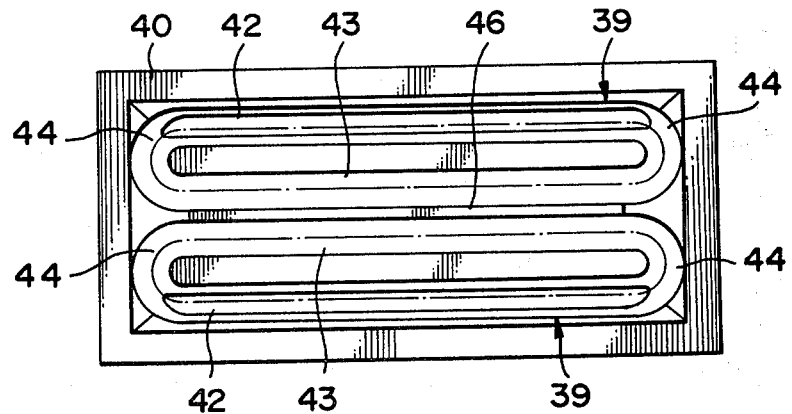
FIG. 12 is right side view of the ball side.

The ball slide 33 is disposed between the bracket 31 and each side of the guide member 32. As depicted in FIGS. 11 and 12, the ball slide 33 comprises a ball retainer 40 having two ball circulating paths 39 and a number of balls 41 housed in each ball circulating path 39 in such a manner that they can roll along the path 39. The ball retainer 40 is made of synthetic resin or the like and each ball circulating path 39 is formed by interconnecting outer and inner guide grooves 42 and 43 at both ends thereof through intercommunicating paths 44. The balls 39 are inserted into each ball circulating path 39 through an opening 45 to the inner guide groove 43. The ball retainer 40 has such a configuration that its bottom receives the projection 34 of the bracket 31, and the bottom of the ball retainer 40 has a centrally disposed projection 46 formed integrally therewith.

The ball slide 33 is assembled with the bracket 31, with its projection 46 inserted into an elongated slot 34a made in the projection 34 of the bracket 31. To secure this assembly, for example, end plates 47 are attached to both ends of the bracket 31 to press and fix both ends of the ball slide 33. At the same time, both side portions 50 of the ball retainer 40 are retained by retaining pieces 48 and 49, formed by bending the end plates 47.

The balls 41 held in the outer guide grooves 42 of the ball slide 33 thus attached to the guide member 32 make angular contact with the ball grooves 35 and 38.

Figure 1:
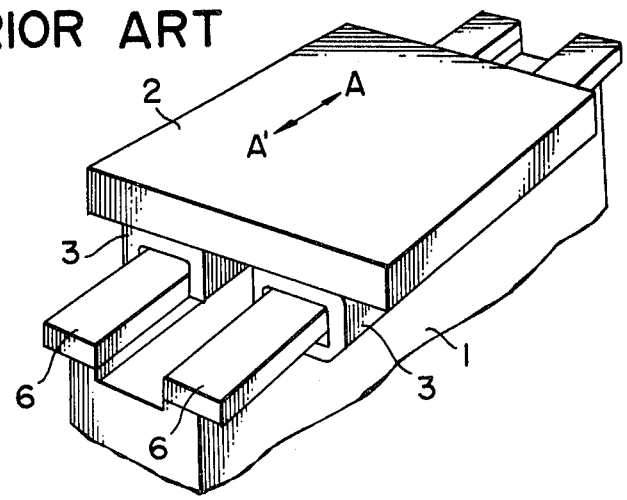
FIG. 1 is a perspective view showing the external appearance of a conventional ball slideway.
Figure 2:
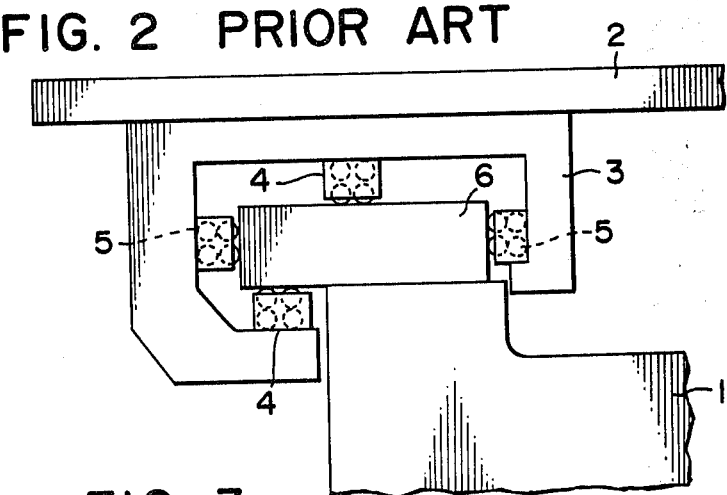
FIG. 2 is a front view of the conventional ball slideway shown in FIG. 1.
Figure 3:
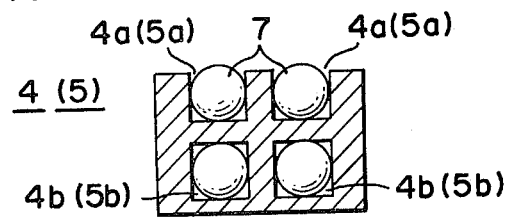
FIG. 3 is a sectional view of a conventional ball slideway.

Since the balls 41 incorporated in the ball slide 33 make angular contact with the ball grooves 35 and 38 formed in the bracket 31 and the guide member 32, the load capacity is larger than in the prior art example depicted in FIGS. 1 to 3. Furthermore, sufficient spacing of the slopes 36 forming the recess 37 ensures the holding of the bracket 31 even if external forces of various directions are applied to the bracket 31. By selecting the angle of inclination of each slope 36 to be 45° relative to the side of the guide member 32, reaction forces which are applied by an external force to the bearing are equally distributed in all directions.

The ball slide of such a construction is employed, for example, as a sliding support member between the bed and the work table of a machine tool in the same manner as described previously with regard to the foregoing embodiment.

Two guide members 32 of a suitable length are mounted on the bed and two brackets 31, each holding a pair of ball slides 33, are combined with each guide member 32, with the balls 41 of each ball slide 33 engaged with the ball grooves 38. These four brackets are fixed to the work table at predetermined intervals.

In this way, the work table can be mounted on the bed through the four ball slideways. When sliding the work table, the balls 41 are guided by the ball grooves 38 of each guide member 32 and the ball grooves 35 of the bracket 31 to roll from the outer guide groove 42 of the ball retainer 40 to the inner guide groove 43 through the intercommunicating path 44 and thence to the outer guide groove 42. The ball circulating path in this case is indicated by the chain lines in FIGS. 10 and 12. Accordingly, the work table is slidably supported on the bed. In addition, since the balls make angular contact withe the guide grooves as described above and since the slopes 36 can be spaced a sufficiently large distance apart utilizing substantially the entire width of the side of the guide member 32, the load capacity can be increased and the work table can surely be held regardless of the direction of an external force acting on the work table.

Preloading of the balls 41 can be achieved, for example, by such means as follows:

Namely, as indicated by chain lines in FIG. 9, a slit 51 is made in the bracket 31 and a preload adjustment bolt 52 is threadably engaged with the bracket 31 outwardly of the slit 51 and, by tightening the bolt 52, the preload can be imparted to the balls.

In this embodiment, the recess 37 is formed deep to provide the slopes 36 and the ball grooves 38 are cut in the intermediate portions of the slopes 36 and the balls 41 making angular contact with the ball grooves 38 circulate inwardly. In contrast thereto, in the foregoing embodiment, the guide grooves 25 are formed by relatively shallow recesses 26 and the balls 16 making angular contact with the guide grooves 25 circulate outwardly. These two embodiments differ slightly in these points but are similar to each other in their basic construction and operation.

As has been described in the foregoing, the present invention exhibits various advantages as follows:

(1) Since the bracket can firmly be held and guided by ball slides provided on both sides of the guide member, the construction is simplified as compared with the prior art.

(2) The balls make angular contact with the ball grooves, and the ball grooves which enable the angular contact can be spaced a large distance apart making use of the entire width of the slide of the guide member; therefore, the load capacity can be increased.

It will be apparent that many modifications and variations may be effected without departing from the scope of the novel concepts of this invention.

What is claimed is:
1. A ball slideway, comprising:
   (a) a central guide member having a recess therein formed by sloping sides and a pair of first substantially parallel elongated ball grooves, each ball groove formed in a sloping side, and each ball groove being a first distance apart from the other groove;
   (b) a plurality of balls;
   (c) a bracket member pressed against and partially surrounding the guide member for linear movement with respect thereto, the bracket member including a portion thereof projecting toward the recess of the guide member, the projecting portion having a pair of second elongated ball grooves adjacent the first pair of ball grooves and substantially parallel thereto, the distance between each of the second ball grooves being less than the distance between each of the first ball grooves, and said first and second ball grooves being formed so that respective lines of force acting on the balls and passing through the middle of each of the first ball grooves and each of the corresponding second ball grooves intersect outside the guide member; and
   (d) ball retainer means mounted between the guide and bracket members for defining a pair of independent, continuous ball circulating paths to retain the balls and permit them to circulate when the bracket member is moved linearly with respect to the guide member, and wherein the plane of one of the ball circulating paths is skew to the plane of the other ball circulating path.

* * * * *

UNITED STATES PATENT AND TRADEMARK OFFICE
CERTIFICATE OF CORRECTION

PATENT NO. : 4,420,194

DATED : 12/13/83

INVENTOR(S) : KANJI ASAMI

It is certified that error appears in the above-identified patent and that said Letters Patent is hereby corrected as shown below:

<u>Front Page</u>, (57) ABSTRACT, line 4, "A ball" should be --Ball--.

<u>Column 4</u>

Line 64, "withe" should be --with--.

Signed and Sealed this

Seventeenth Day of April 1984

[SEAL]

Attest:

GERALD J. MOSSINGHOFF

Attesting Officer     Commissioner of Patents and Trademarks